(12) United States Patent
Kaneko et al.

(10) Patent No.: US 8,179,671 B2
(45) Date of Patent: May 15, 2012

(54) INFORMATION PROCESSING APPARATUS

(75) Inventors: Toshihiro Kaneko, Shizuoka (JP);
Kazuyuki Matsumura, Shizuoka (JP);
Kazuhiro Fushimi, Shizuoka (JP);
Takashi Ootashiro, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 126 days.

(21) Appl. No.: 12/701,736

(22) Filed: Feb. 8, 2010

(65) Prior Publication Data

US 2010/0202274 A1    Aug. 12, 2010

(30) Foreign Application Priority Data

Feb. 12, 2009  (JP) ................................. 2009-030250

(51) Int. Cl.
   *G06F 1/16*     (2006.01)
   *H05K 7/00*     (2006.01)
   *H05K 5/00*     (2006.01)

(52) U.S. Cl. .............................. 361/679.34; 361/679.36

(58) Field of Classification Search . 361/679.33–679.39
See application file for complete search history.

(56) References Cited

U.S. PATENT DOCUMENTS

| | | | |
|---|---|---|---|
| 5,332,306 A * | 7/1994 | Babb et al. | 312/334.16 |
| 5,595,430 A * | 1/1997 | Weyeneth | 312/319.1 |
| 5,730,515 A * | 3/1998 | Ho | 312/350 |
| 5,748,442 A * | 5/1998 | Toor | 361/679.31 |
| 6,075,694 A * | 6/2000 | Mills et al. | 361/679.02 |
| 6,122,173 A * | 9/2000 | Felcman et al. | 361/726 |

(Continued)

FOREIGN PATENT DOCUMENTS

JP      3089613    10/2002

(Continued)

OTHER PUBLICATIONS

Japanese Office Action dated Feb. 1, 2011 corresponding to U.S. Appl. No. 12/701,736, filed Feb. 8, 2010.

*Primary Examiner* — Jinhee Lee
*Assistant Examiner* — Adrian S Wilson
(74) *Attorney, Agent, or Firm* — Turocy & Watson, LLP (57) ABSTRACT

An information processing apparatus includes: a hard disk drive unit including a hard disk drive configured to read various data from and write various data in a magnetic disk incorporated therein; a housing of an apparatus main body configured to hold the hard disk drive on a substrate to be freely attached and detached; a hard-disk-drive holding member provided in the hard disk drive unit, configured to include a first anti-vibration member having vibration damping properties disposed on a predetermined surface parallel to a disk width direction of the magnetic disk and fix and hold the hard disk drive in a state in which the first anti-vibration member is sandwiched between the hard disk drive and the predetermined member, and formed of a metal member; a member to be guided provided in the hard disk drive unit and provided on a surface parallel to the disk width direction of the magnetic disk different from the predetermined surface of the hard-disk-drive holding member; and a base member provided in the housing of the apparatus main body, configured to have a guide section for guiding the member to be guided in attaching and detaching directions of the hard disk drive unit and come into contact with the hard-disk-drive holding member of the hard disk drive unit attached to the substrate according to the guide by the guide section, and formed of a metal member.

14 Claims, 6 Drawing Sheets

U.S. PATENT DOCUMENTS

| | | | |
|---|---|---|---|
| 6,166,901 A * | 12/2000 | Gamble et al. | 361/679.34 |
| 6,351,376 B1 * | 2/2002 | Liang et al. | 361/679.33 |
| 6,354,861 B2 * | 3/2002 | Schmitt et al. | 439/376 |
| 6,362,955 B2 * | 3/2002 | Felcman et al. | 361/679.32 |
| 6,388,874 B1 * | 5/2002 | Liang et al. | 361/679.57 |
| 6,567,265 B1 * | 5/2003 | Yamamura et al. | 361/679.34 |
| 6,618,247 B2 * | 9/2003 | Felcman et al. | 361/679.6 |
| 7,137,767 B2 * | 11/2006 | Franke et al. | 411/401 |
| 7,190,574 B2 * | 3/2007 | Muenzer et al. | 361/679.32 |
| 7,239,593 B2 * | 7/2007 | Abe | 369/75.11 |
| 7,289,317 B2 * | 10/2007 | Hood et al. | 361/679.33 |
| 7,369,402 B2 * | 5/2008 | Huang | 361/679.33 |
| 7,471,509 B1 * | 12/2008 | Oliver | 361/679.33 |
| 7,495,904 B2 * | 2/2009 | Liang et al. | 361/679.39 |
| 7,639,490 B2 * | 12/2009 | Qin et al. | 361/679.34 |
| 2002/0067592 A1 * | 6/2002 | Horiuchi et al. | 361/685 |
| 2003/0174464 A1 * | 9/2003 | Funawatari et al. | 361/685 |
| 2004/0228073 A1 * | 11/2004 | Chuang | 361/679 |
| 2005/0088815 A1 * | 4/2005 | Chen et al. | 361/685 |
| 2006/0023416 A1 * | 2/2006 | Chen | 361/685 |
| 2006/0067043 A1 | 3/2006 | Kotani et al. | |
| 2006/0187631 A1 * | 8/2006 | Muenzer et al. | 361/685 |
| 2007/0127204 A1 * | 6/2007 | Muenzer et al. | 361/685 |
| 2008/0080129 A1 * | 4/2008 | Morris | 361/685 |
| 2008/0174950 A1 * | 7/2008 | He | 361/685 |

FOREIGN PATENT DOCUMENTS

| | | |
|---|---|---|
| JP | 2004-310821 | 11/2004 |
| JP | 2005-172013 | 6/2005 |
| JP | 2006-092703 | 4/2006 |

* cited by examiner

INFORMATION PROCESSING APPARATUS

CROSS-REFERENCE TO RELATED APPLICATION

This application claims the benefit of priority from Japanese Patent Application No. 2009-030250 filed on Feb. 12, 2009, the entire content of which is incorporated herein by reference.

TECHNICAL FIELD

The present invention relates to an information processing apparatus.

BACKGROUND

Conventionally, there is a commodity-sales-data processing apparatus (an information processing apparatus) such as an electronic cash register (ECR) or a point of sales (POS) terminal including a hard disk drive (HDD).

The HDD is susceptible vibration because of the structure thereof. When strong vibration is applied from the outside during data reading and writing operation, in some cases, abnormality occurs in data reading and writing. Therefore, there is a commodity-sales-data processing apparatus that adopts an anti-vibration structure to attach the HDD (see, JP-A-2006-092703).

In recent years, to improve maintainability of a POS terminal, there is a demand for a HDD attachment structure that can attach the HDD with one touch of a finger instead of fixing by a screw or the like. In this case, it is necessary to take into account not only the HDD anti-vibration structure but also earthing performance.

However, the commodity-sales-data processing apparatus disclosed in JP-A-2006-092703 has a structure in which each HDD frame is floated by anti-vibration rubber. Therefore, it is necessary to separately screw an earth line. The earth line is screwed at the sacrifice of the maintainability.

SUMMARY

The present invention has been devised in view of the above and it is an object of the present invention to provide an information processing apparatus that can realize both anti-vibration performance for a hard disk drive and earthing performance without spoiling maintainability in terms of one-touch replacement of a hard disk drive unit.

According to an aspect of the present invention, there is provided an information processing apparatus including: a hard disk drive unit including a hard disk drive configured to read various data from and write various data in a magnetic disk incorporated therein; a housing of an apparatus main body configured to hold the hard disk drive on a substrate to be freely attached and detached; a hard-disk-drive holding member provided in the hard disk drive unit, configured to include a first anti-vibration member having vibration damping properties disposed on a predetermined surface parallel to a disk width direction of the magnetic disk and fix and hold the hard disk drive in a state in which the first anti-vibration member is sandwiched between the hard disk drive and the predetermined member, and formed of a metal member; a member to be guided provided in the hard disk drive unit and provided on a surface parallel to the disk width direction of the magnetic disk different from the predetermined surface of the hard-disk-drive holding member; and a base member provided in the housing of the apparatus main body, configured to have a guide section for guiding the member to be guided in attaching and detaching directions of the hard disk drive unit and come into contact with the hard-disk-drive holding member of the hard disk drive unit attached to the substrate according to the guide by the guide section, and formed of a metal member.

DETAILED DESCRIPTION

An embodiment of the present invention is explained below with reference to FIGS. 1 to 7. This embodiment is an example in which a point of sales (POS) terminal, which is a commodity-sales-data processing apparatus, is applied as an information processing apparatus.

Figure 1:
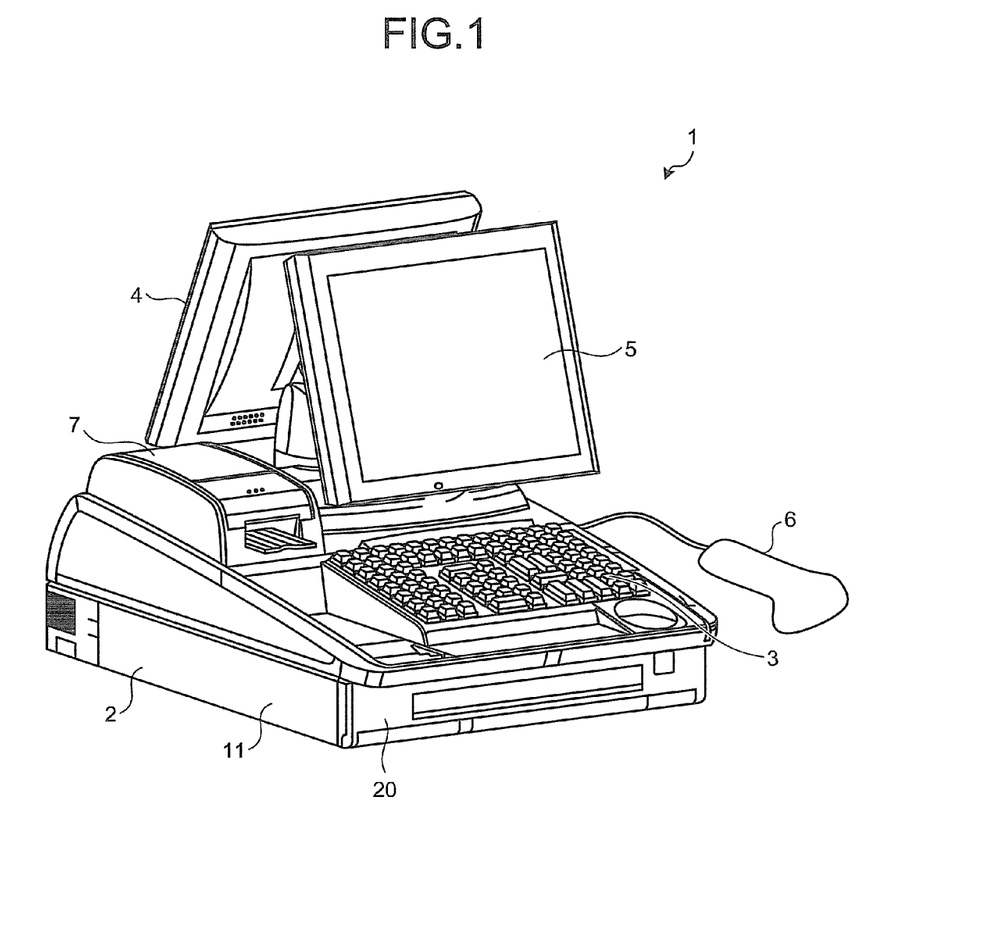
FIG. 1 is an external perspective view of a POS terminal according to an embodiment of the present invention.
Figure 2:
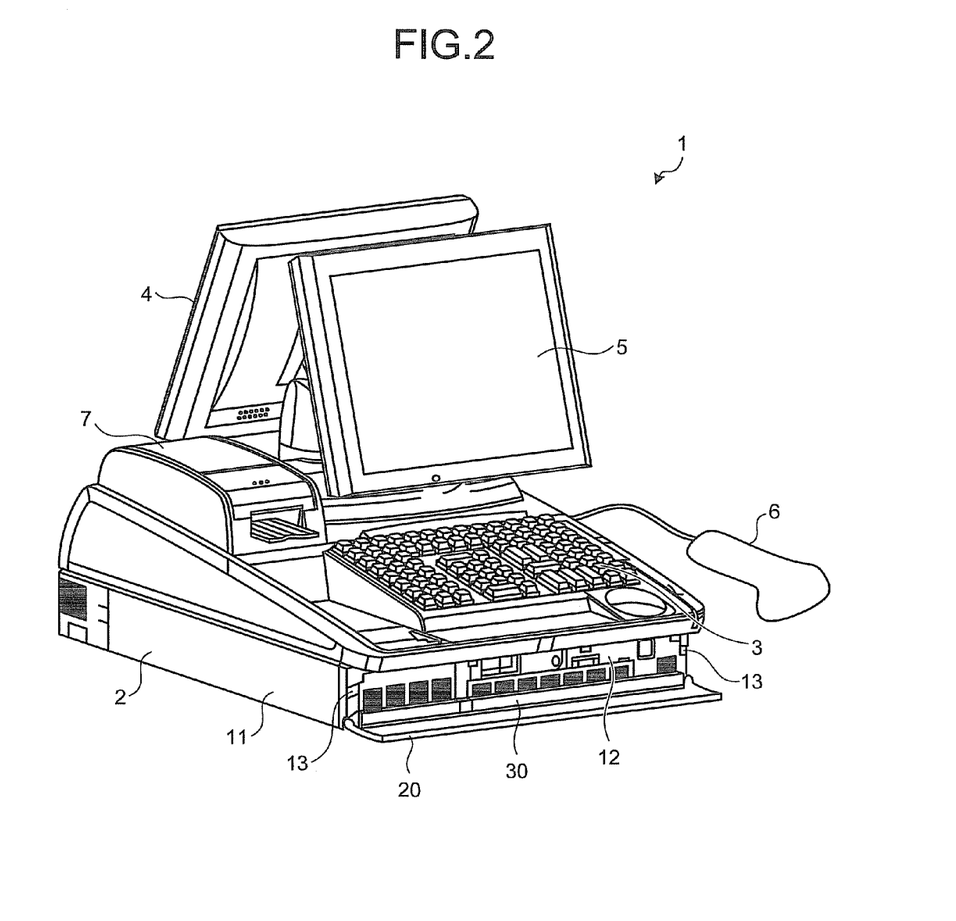
FIG. 2 is an external perspective view of the POS terminal with a front cover opened.

FIG. 1 is an external perspective view of a POS terminal according to this embodiment. FIG. 2 is an external perspective view of the POS terminal 1 with a front cover 20 opened. As shown in FIGS. 1 and 2, in the POS terminal 1, a keyboard 3, a display for customer 4, a display for cashier 5, a barcode scanner 6, a thermal printer 7, and the like are connected to a control unit 2, which is an apparatus main body.

The control unit 2 incorporates a main substrate 90 (see FIG. 7) as a control section configured to control to drive the respective units and a hard disk drive (HDD) unit 50 (see FIG. 3) configured to read various data from and write various data in a magnetic disk incorporated therein. The control section mainly includes a central processing unit (CPU) configured to centrally control the respective units. The keyboard 3, the display for customer 4, the display for cashier 5, the barcode scanner 6, the thermal printer 7, and the HDD unit 50 are connected to the control section via a not-shown I/O.

The HDD unit 50 has stored therein a commodity master file, a journal file, and the like besides a computer program for causing the control section to operate. The commodity master file is a file configured to store commodity names, unit prices, and the like in association with commodity codes. The journal file is a file configured to store journal data such as a sales statement and an amount of sales as sales data in association with transaction numbers.

As shown in FIGS. 1 and 2, the control unit 2 has a housing 11 of a rectangular parallelepiped apparatus main body. The housing 11 is mounted with the keyboard 3, the display for cashier 5, the display for customer 4, and the thermal printer 7. The housing 11 includes the main substrate 90, the HDD unit 50 and the like. The housing 11 includes, in front thereof, the front cover 20 attached with an iron magnet bearing (not shown) configured to receive a magnet 13 explained later. The front cover 20 is a cover that opens and closes when maintenance of the HDD unit 50 and the like incorporated in the control unit 2 is performed. In the housing 11 of the control unit 2, a surface on which the keyboard 3 and the like are mounted is referred to as mounting surface. A surface placed on a not-shown drawer or the like is referred to as placing surface.

In the control unit 2, the front cover 20 located on an operator side of the housing 11 is pivotally provided to freely rotate with respect to a front panel 12 on the placing surface side of the housing 11. In the control unit 2, the magnet 13 is disposed on the mounting surface side of the housing 11 in the front panel 12. With such a configuration, when the mounting surface side of the housing 11 in the front cover 20 is pulled, the magnet bearing of the front cover 20 is detached from the magnet 13 of the front panel 12 and opens and closes around a shaft on the placing surface side of the housing 11 in the front cover 20. Therefore, the front cover 20 pivots between an open position and a closed position to freely open and close with respect to the front panel 12 of the housing 11.

An attaching and detaching structure for the HDD unit 50, which is a characteristic of the POS terminal 1 according to this embodiment, is explained.

As shown in FIG. 2, the front panel 12 of the housing 11 detachably includes a HDD cover 30. During maintenance of the HDD unit 50, a user can access the HDD unit 50 by opening the front cover 20 and removing the HDD cover 30 in the inside.

Figure 3:
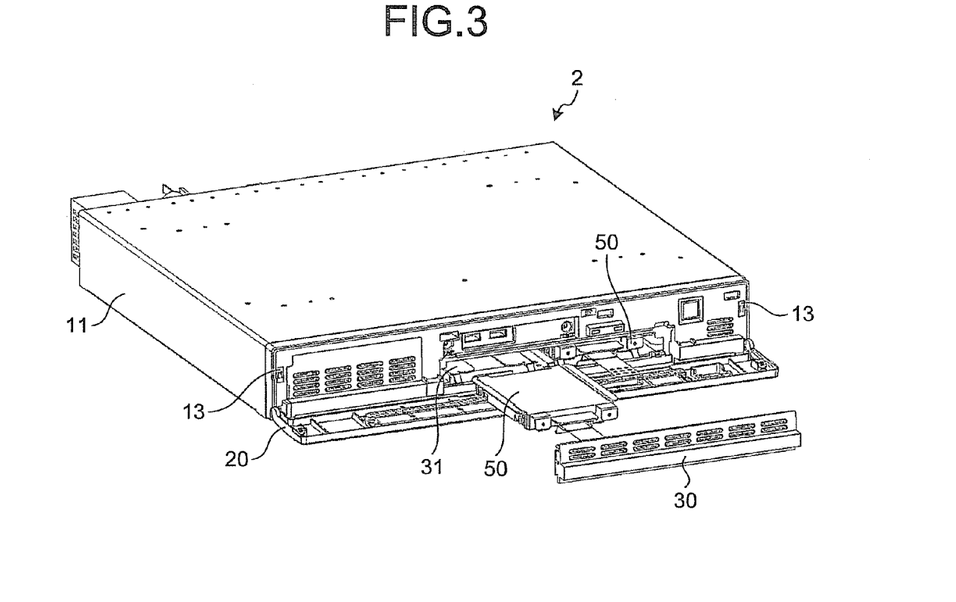
FIG. 3 is an external perspective view of a control unit with a HDD cover and a HDD unit detached therefrom.
Figure 4:
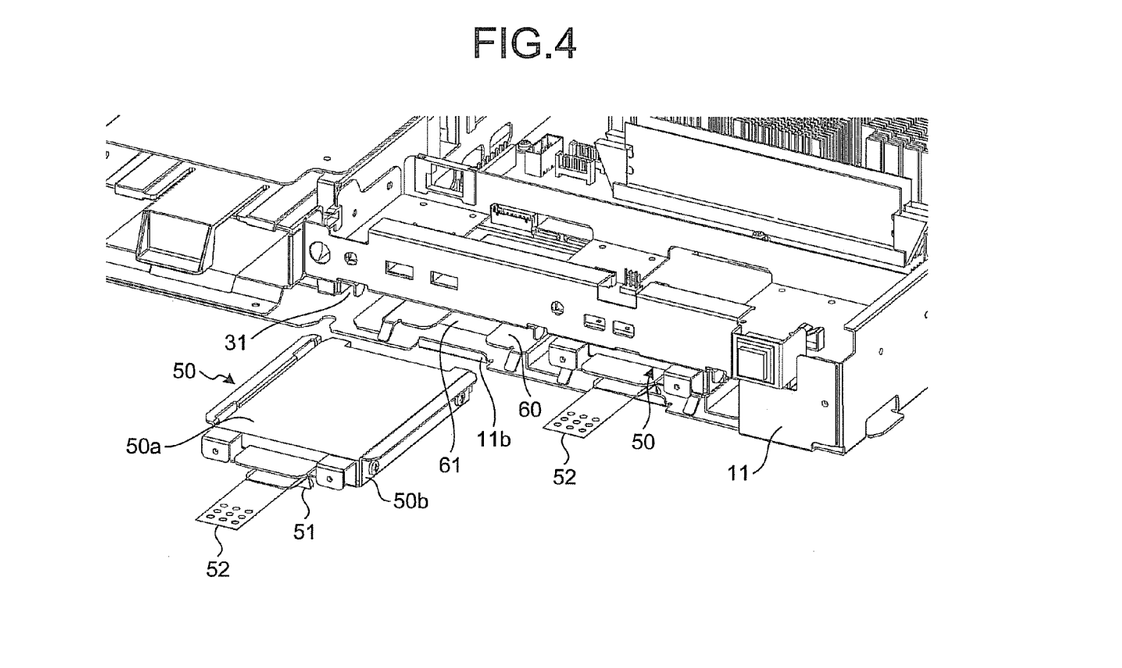
FIG. 4 is an enlarged external perspective view of a part of the control unit.
Figure 5:
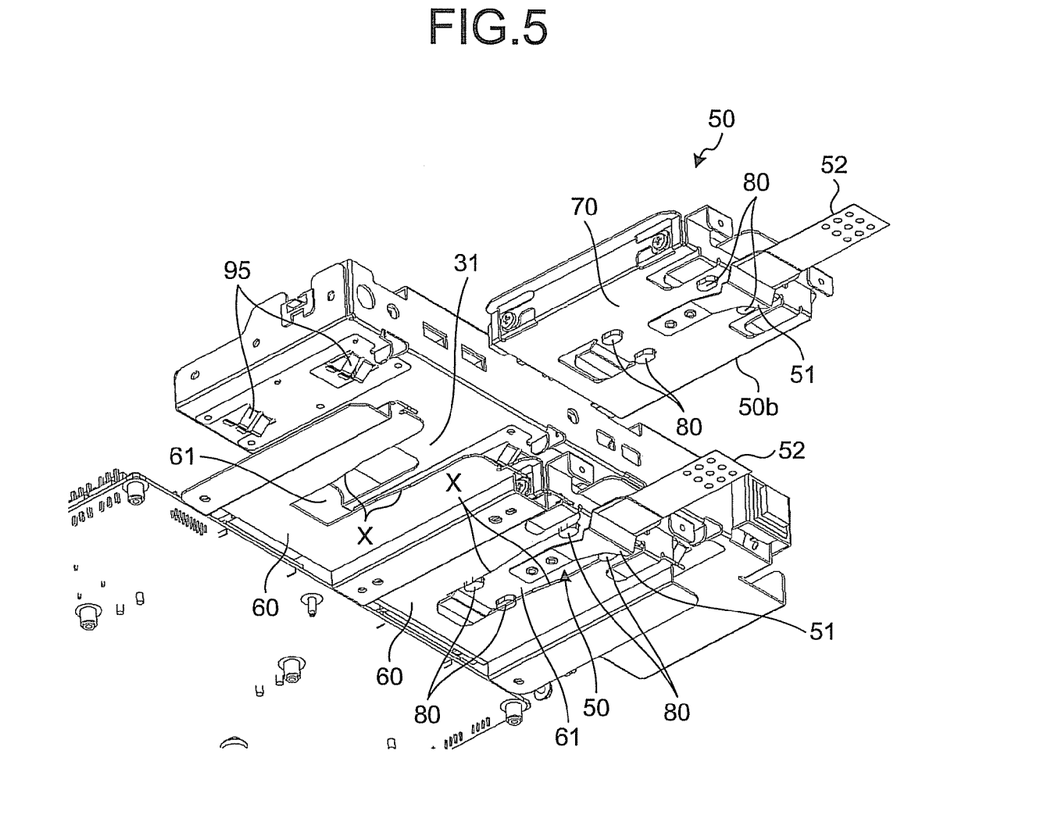
FIG. 5 is an enlarged external perspective view of the part of the control unit viewed from another direction.

FIG. 3 is an external perspective view of the control unit 2 with the HDD cover 30 and the HDD unit 50 detached therefrom. FIG. 4 is an enlarged external perspective view of a part of the control unit 2. FIG. 5 is an enlarged external perspective view of the part of the control unit 2 viewed from another direction. In an example shown in FIGS. 3 to 5, two HDD units 50 are arranged side by side. As shown in FIGS. 3 to 5, the front panel 12 has an opening 31. The opening 31 is exposed when the front cover 20 is opened and the HDD cover 30 is detached from the front panel 12. The POS terminal 1 includes the HDD units 50 on the inner side of the opening 31 in the housing 11.

As shown in FIGS. 4 and 5, the POS terminal 1 includes a HDD base 60, which is a base member, in the housing 11. The HDD base 60 includes a guide section 61 configured to guide a member to be guided explained later of the HDD unit 50 in attaching and detaching directions of the HDD unit 50 and is formed of a metal member.

In addition, as shown in FIG. 5, the POS terminal 1 includes, in the inside of the housing 11, an elastic member 95 configured to press a housing 50b of the mounted HDD unit 50 against the HDD base 60 from above. The elastic member 95 is, for example, a leaf spring.

Figure 6:
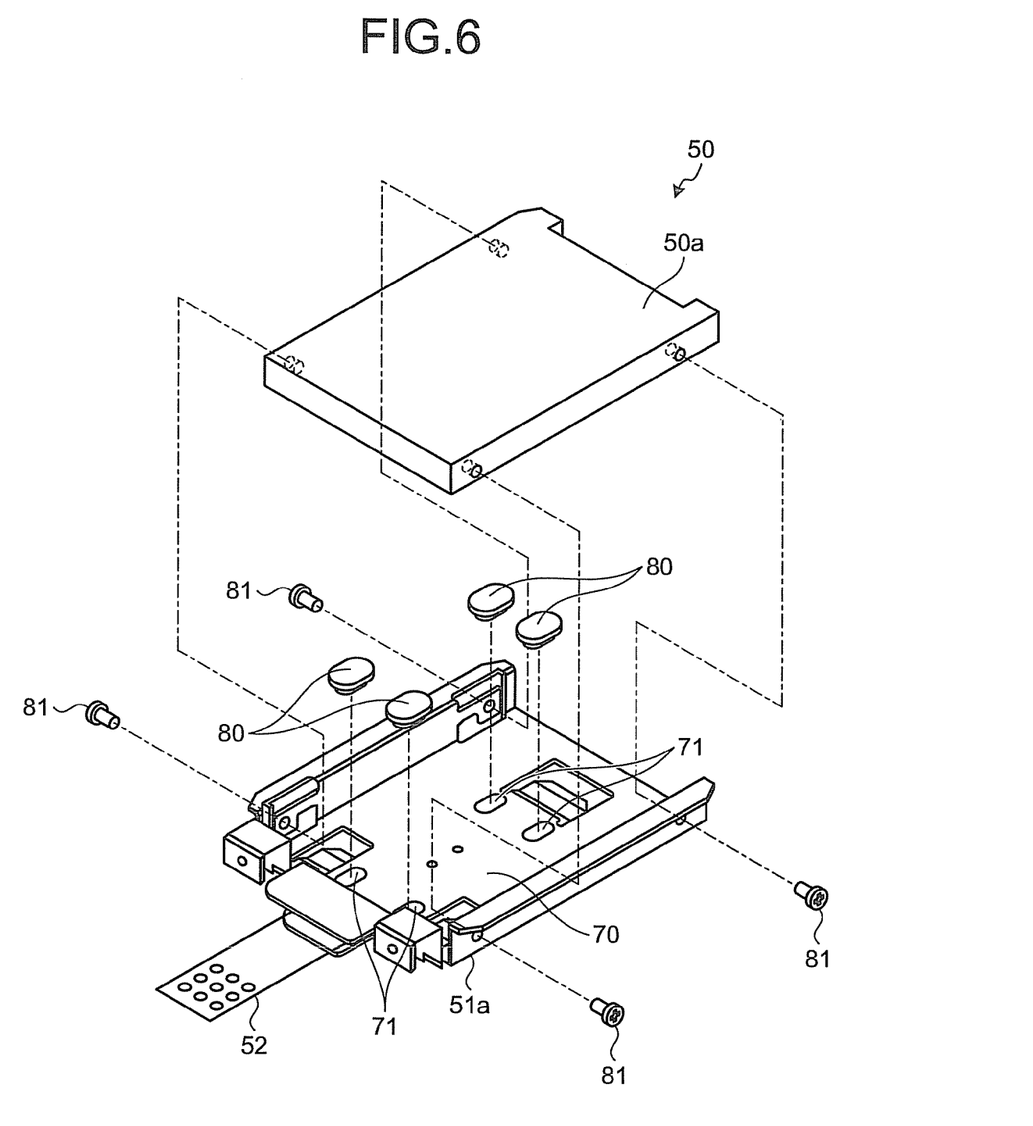
FIG. 6 is a disassembled perspective view of the configuration of the HDD unit.
Figure 7:
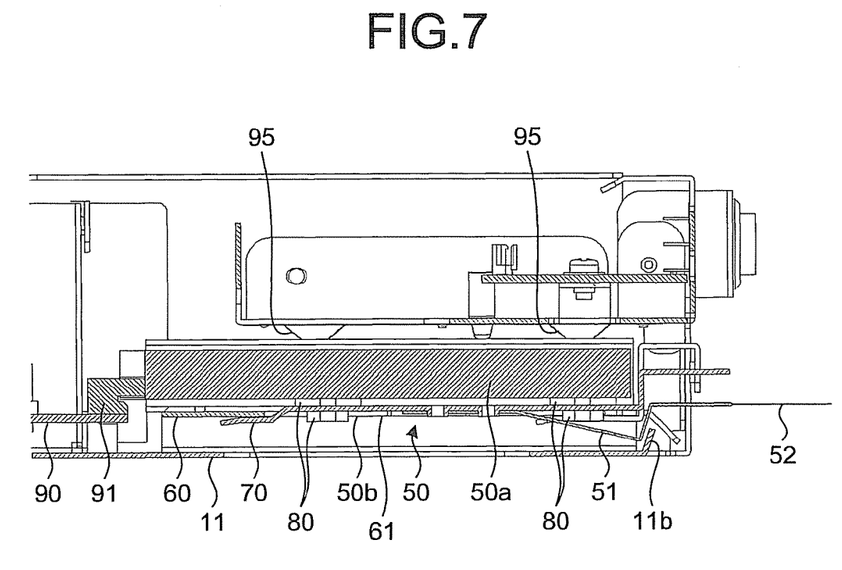
FIG. 7 is a sectional view in which the HDD unit is mainly shown.

The configuration of the HDD unit 50 is explained in detail. FIG. 6 is a disassembled perspective view of the configuration of the HDD unit 50. FIG. 7 is a sectional view in which the HDD unit 50 is mainly shown. As shown in FIG. 6 or 7, the HDD unit 50 schematically includes a HDD 50a and the housing 50b, which is a hard-disk-drive holding member, configured to hold the HDD 50a and formed of a metal member. In the HDD unit 50, the HDD 50a is screwed to the housing 50b by a screw 81. The housing 50b has plural substantially elliptical holes 71 in a bottom 70, which is a predetermined surface, parallel to a disk width direction of a magnetic disk. In the HDD unit 50, anti-vibration rubbers 80 having vibration damping properties are fit in the holes 71. As shown in FIG. 7, the anti-vibration rubbers 80 fit in the holes 71 are exposed to both sides of the bottom 70 of the housing 50b.

The HDD 50a and the bottom 70 of the housing 50b sandwich the anti-vibration rubbers 80 exposed to the side of the housing 50b on which the HDD 50a is held. In other words, the anti-vibration rubbers 80 function as a first anti-vibration member. On the other hand, the anti-vibration rubbers 80 exposed to the outside of the housing 50b function as a second anti-vibration member. The anti-vibration rubbers 80 exposed to the outside of the housing 50b also function as a member to be guided that is guided by the guide section 61 of the HDD base 60. In other words, in this embodiment, the anti-vibration rubbers 80 alone are integrally formed as the first anti-vibration member and the second anti-vibration member.

In a state in which the HDD unit 50 is mounted, as shown in FIG. 5, the guide section 61 of the HDD base 60 guides the anti-vibration rubbers 80, which are exposed to the outside of the housing 50b, in the attaching and detaching directions of the HDD unit 50 while bringing the anti-vibration rubbers 80 into contact with end faces X. In this case, the housing 50b of the HDD unit 50 slides on the HDD base 60. As explained above, the main substrate 90 (see FIG. 7) having a connector 91 is provided in the inside of the housing 11. When the HDD unit 50 is guided, the HDD unit 50 is finally inserted into the connector 91. In a state in which the HDD unit 50 is finally mounted on the HDD base 60, the anti-vibration rubbers 80 overlap the end faces X of the guide section 61 of the HDD base 60 by about 1 millimeter. In this state, the HDD 50a can prevent its own vibration with respect to the width direction of the disk incorporated in the HDD 50a. Further, in this state, the housing 50b, which is formed of the metal member, of the HDD unit 50 and the HDD base 60, which is formed of the metal member, are set in contact with each other. Therefore, an earth can be secured.

As shown in FIG. 5 and the like, the HDD unit 50 includes a lock lever 51 on the detaching direction side of the HDD unit 50. The lock lever 51 interferes with an interfering member 11b formed to be bent in a bottom 11a on the placing surface side of the housing 11. The lock lever 51 has a pull-out seat 52 at an end thereof. The lock lever 51 is molded by bending a sheet metal.

In detaching the HDD unit 50 from the housing 11, the user holds and pulls the pull-out seat 52 attached to the distal end of the lock lever 51 provided in the HDD unit 50. When the pull-out seat 52 is pulled, the sheet metal as the lock lever 51 interfering with the interfering member 11b is stretched. Therefore, the lock lever 51 climbs over the interfering member 11b, whereby the lock lever 51 is unlocked. In this way, the user can pull out the HDD unit 50 from the opening 31 of the housing 11 while a fitting section 50c of the HDD unit 50 is guided by the guide section 61 of the HDD base 60.

On the other hand, in pushing the HDD unit 50 into the housing 11, the user pushes the HDD unit 50 into the opening 31 of the housing 11. When the HDD unit 50 is pushed into the opening 31 of the housing 11, the lock lever 51 climbs over the interfering member 11b and deforms the elastic member 95, whereby the anti-vibration rubbers 80 functioning as the member to be guided of the HDD unit 50 are guided by the guide section 61 of the HDD base 60 and fit in fixed positions. The housing 50b of the HDD unit 50 mounted in this way are pressed from above by the elastic member 95, whereby the HDD unit 50 is brought into press contact with the HDD base 60. Therefore, an earth can be surely secured.

As explained above, according to this embodiment, the hard disk drive unit having the hard disk drive configured to read various data from and write various data in the magnetic disk incorporated therein includes the hard-disk-drive holding member and the member to be guided. The hard-disk-drive holding member is configured to include the first anti-vibration member having vibration damping properties disposed on the predetermined surface parallel to the disk width direction of the magnetic disk and fix and hold the hard disk drive in a state in which the first anti-vibration member is sandwiched between the hard disk drive and the predetermined surface. The hard-disk-drive holding member is formed of the metal member. The member to be guided is provided on the surface parallel to the disk width direction of the magnetic disk different from the predetermined surface of the hard-disk-drive holding member. The housing of the apparatus main body configured to hold the hard disk drive to be freely attached to and detached from the substrate includes the guide section configured to guide the member to be guided in the attaching and detaching directions of the hard disk drive unit. The housing comes into contact with the hard-disk-drive holding member of the hard disk drive unit attached to the substrate according to the guide of the guide section. The housing includes the base member formed of the metal member. Consequently, it is possible to realize, without spoiling maintainability in terms of one-touch replacement of the hard disk drive unit, both anti-vibration performance for the hard disk drive by the first anti-vibration member in the hard-disk-drive holding member and earthing performance achieved by the contact of the hard-disk-drive holding member formed of the metal member and the base member formed of the metal member.

In this embodiment, the POS terminal, which is the commodity-sales-data processing apparatus, is applied as the information processing apparatus. However, the present invention is not limited to this. Various information processing apparatuses such as a personal computer can be applied as the information processing apparatus.

Further effects and modifications can be easily derived by those skilled in the art. Therefore, a wider aspect of the present invention is not limited by the specific details and the representative embodiment represented and described above. Therefore, various modifications are possible without departing from the spirit or the scope of the general concept of the invention defined by the appended claims and their equivalents.

What is claimed is:

1. An information processing apparatus comprising:
   a hard disk drive unit including a hard disk drive configured to read various data from and write various data in a magnetic disk incorporated therein;
   a housing of an apparatus main body configured to hold the hard disk drive on a substrate to be freely attached and detached;
   a hard-disk-drive holding member provided in the hard disk drive unit, configured to include a first anti-vibration member having vibration damping properties disposed on a predetermined surface parallel to a disk width direction of the magnetic disk and fix and hold the hard disk drive in a state in which the first anti-vibration member is sandwiched between the hard disk drive and the predetermined surface, and formed of a metal member;
   a member to be guided provided in the hard disk drive unit and provided on a surface parallel to the disk width direction of the magnetic disk different from the predetermined surface of the hard-disk-drive holding member; and
   a base member provided in the housing of the apparatus main body, configured to have a guide section for guiding the member to be guided in attaching and detaching directions of the hard disk drive unit and come into contact with the hard-disk-drive holding member of the hard disk drive unit attached to the substrate according to the guide by the guide section, and formed of a metal member.

2. The apparatus according to claim 1, wherein the housing of the apparatus main body includes an elastic member configured to press the hard disk drive unit attached to the substrate against the base member according to the guide of the guide section.

3. The apparatus according to claim 1 or 2, wherein the member to be guided is a second anti-vibration member having vibration damping properties, and an end face of the guide section overlaps the second anti-vibration member in a state in which the hard disk drive unit is attached to the substrate.

4. The apparatus according to claim 3, wherein the second anti-vibration member is formed integrally with the first anti-vibration member.

5. The apparatus according to claim 1, wherein the first anti-vibration member is fit in a hole formed in the predetermined surface of the hard-disk-drive holding member.

6. The apparatus according to claim 5, wherein the hole has a substantially elliptical shape.

7. The apparatus according to claim 5, wherein a plurality of the holes are provided.

8. The apparatus according to claim 1, wherein the housing includes an interfering member formed on a bottom thereof, the hard disk drive unit includes:
   a lock lever molded by bending a sheet metal on the detaching direction side of the hard disk drive unit and configured to interfere with the interfering member in a state in which the lock lever is attached to the housing; and
   a pull-out seat provided at an end of the lock lever, in detaching the hard disk drive unit from the housing, a user stretches a sheet metal as the lock lever interfering with the interfering member by holding and pulling the pull-out seat to cause the lock lever to climb over the interfering member to be unlocked, and in pushing the hard disk drive unit into the housing, the user stretches the sheet metal as the lock lever by pushing in the hard disk drive unit to cause the lock lever to climb over the interfering member.

9. The apparatus according to claim 1, wherein the hard disk drive and the hard-disk-drive holding member are screwed by a screw.

10. The apparatus according to claim 2, wherein the elastic member is a leaf spring.

11. The apparatus according to claim 1, wherein the first anti-vibration member is elastic.

12. The apparatus according to claim 11, wherein the first anti-vibration member is made of rubber.

13. The apparatus according to claim 3, wherein the second anti-vibration member is elastic.

14. The apparatus according to claim 13, wherein the second anti-vibration member is made of rubber.

* * * * *